3,661,881
PROCESS FOR PREPARING VINYL CHLORIDE POLYMERS OF REDUCED POROSITY
Donald E. Moore, Coleman, Mich., assignor to The Dow Chemical Company, Midland, Mich.
No Drawing. Continuation of application Ser. No. 661,206, Aug. 17, 1967. This application Sept. 3, 1970, Ser. No. 69,446
Int. Cl. C08f 1/11, 3/30
U.S. Cl. 260—92.8 W   5 Claims

ABSTRACT OF THE DISCLOSURE

This invention is directed to a process for preparing vinyl chloride polymer of reduced porosity in aqueous suspension while in the presence of a monomer-soluble polymerization catalyst and while maintaining an essentially constant reaction temperature. More particularly, the polymerization reaction is continued until a decrease of from about 1 to 20 p.s.i. from the liquid-vapor equilibrium pressure of the reaction occurs. Thereafter, the reduced pressure is maintained by the addition of monomer and polymerizing of the same in contact with the previously formed polymer until a polymer product of lower porosity is obtained.

---

This application is a continuation of application Ser. No. 661,206, filed Aug. 17, 1967, now abandoned.

It is well known that vinyl chloride monomer may be polymerized in aqueous suspension. As the polymerization reaction progresses the polymeric particles form a firm, porous aggregate with the space between the particles filled with monomer. As this monomer polymerizes interparticle voids form which persist and enlarge until the polymerization reaction is completed. The resulting polymers are normally obtained in the form of microporous solids containing as much as 50 percent void volume. It has been found that polymers containing such significant void volume produce articles, such as flow molded films and the like, which are undesirably opaque and are susceptible to swelling by organic solvents. Further, prior attempts to remove such interparticle voids by the utilization of increased reaction temperature, i.e. temperatures in excess of about 60° C., under autogenous pressures, have resulted in undesirable charring and decomposition of the polymeric material.

The process according to the present invention comprises preparing vinyl chloride polymer particles of reduced porosity in aqueous suspension while in the presence of a monomer soluble polymerization catalyst and while maintaining an essentially constant reaction temperature. More particularly, such polymerization reaction is allowed to proceed until a decrease of at least 1 p.s.i., and preferably between about 1 and 20 p.s.i., from the liquid-vapor equilibrium pressure of the reaction takes place. Thereafter, such reduced pressure is maintained by the incorporation of additional monomer at the reaction temperature until a polymer of low porosity is obtained, e.g., as determined by an essentially constant feed rate of such monomer to the reaction. In such process, the initially formed polymer particles, i.e., those particles formed prior to the initial drop in the liquid-vapor equilibrium pressure of the reaction, characteristically are minute grape-like clusters having irregularly shaped pools of monomers within a suspension bead. As polymerization continues, the polymer clusters increase in size within the bead and grow together somewhat and the monomer within the bead is consumed, leaving voids into which water can be drawn. It is at this point that a significant lowering of the liquid-vapor equilibrium pressure of the reaction is observed. Utilization of the present invention, however, wherein a reduced constant pressure, preferably from about 1 to 20 p.s.i., is maintained by the incorporation of additional monomer while maintaining the reaction temperature permits the migration of monomer through the water phase to the pre-formed polymer beads, where it polymerizes in the voids present in such beads. In this regard, it is essential that a monomer soluble polymerization catalyst is used as such catalyst remains with the polymer during the reaction, thus minimizing the undesirable initiation of new polymer particles. Exemplary of preferred monomer - soluble polymerization catalysts are lauroyl peroxide and isopropyl percarbonate, as well as other conventionally used compounds which decompose at the polymerization temperature with the formation of radicals. Such polymerization catalysts are generally used in concentrations between about 0.1 and 5 percent, preferably about 0.3 percent based on the weight of the monomer, at temperatures between about 40° C. and 65° C., preferably between about 45° C. and 55° C., according to the moleclular weight desired. The ratio of the monomer-water phases can vary from about 1:1 to 1:5 parts by weight and is preferably maintained at about 1:2 parts by weight. It is also to be understood that the polymerization in aqueous suspension, according to the present process, may be accomplished in the presence of conventionally used amounts and types of water-soluble or water dispersible granulating agents as well as conventionally used wetting agents and coagulants to aid in the formation of suspension particles of desired size and shape. The advantages of this invention will be apparent from the following illustrative example wherein all parts and percentages are by weight.

EXAMPLE

In each of a series of separate experiments 91 grams of lauroyl peroxide were added to a clean, dry, reaction kettle consisting of a 20 gallon glass-lined jacketed pfaudler kettle equipped with a glassed crowfoot agitator, wherein the temperature of the kettle was controlled by means of steam and water in the jacket. Upon completion of addition of the lauroyl peroxide, the kettle was purged with one pound of vinyl chloride monomer vapor followed by the addition thereto of 67 pounds of vinyl chloride monomer with sufficient agitation to dissolve the lauroyl peroxide catalyst. Thereafter, 134 pounds of water, containing 140 grams of polyvinyl alcohol dissolved therein, were added with the agitation stopped to prevent phase inversion. The agitator was then started at a rate of 100–150 r.p.m. and the mixture stirred for 10 minutes prior to heating to a reaction temperature of 50° C.

In Run No. 1 the original charge was allowed to react until the pressure had dropped from the equilibrium value of 106 p.s.i. to 66 p.s.i. Analysis of the polymer product showed about 47 percent void volume. The polymer was typical of that produced by conventional batch-wise suspension polymerization.

In Run No. 2, 46 pounds of additional vinyl chloride monomer were continuously added over a period of about 13 hours after the pressure had dropped from an equilibrium value of about 99 p.s.i. to 84 p.s.i. The initial rate of feed of such additional monomer was about 4.5 pounds per hour. The feed rate had dropped to a value of 1 pound per hour after 9.5 hours of continuous monomer addition. Microscopic observation of cross-sections of individual, representative polymer particles indicated a network of solid polymer interspersed with irregularly-shaped open areas representing a void volume of about 34.4 percent. Further, the polymer beads appeared oval-shaped under magnification, but the product was quite discrete and of uniform size.

In Run No. 3, 71 pounds of vinyl chloride monomer were continuously added over a period of 9 hours after the pressure had dropped from an equilibrium value of about 99 p.s.i. to 93 p.s.i. The initial rate of feed of such additional monomer was about 6 pounds per hour with such feed being stopped when a rate of 1 pound per hour had occurred. Microscopic observation of cross-sections of individual, representative polymer particles indicated a network of solid polymer interspersed with irregularly shaped open areas representing a void volume of about 26 percent.

In Run No. 4, 101 pounds of additional vinyl chloride monomer were continuously added over a period of about 27 hours after the pressure had dropped from an equilibrium value of about 99 p.s.i. to 93 p.s.i. During the final 5 hours of monomer addition at reduced pressure, the monomer feed rate held at 1 pound per hour. Microscopic observation of individual, representative polymer particles indicated a network of solid polymer having a void volume of less than about 38 percent.

The following Table I illustrates the reduction in pressure from equilibrium pressure, the amount of additional vinyl chloride monomer added under such reduced pressure and the time of such addition, as well as the overall percent conversion of monomer to polymer and the solution viscosity and porosity of the polymers as prepared in Runs No. 1–4.

TABLE I

| | Run Number | | | |
|---|---|---|---|---|
| | 1 | 2 | 3 | 4 |
| Reduction in pressure (p.s.i.) from equilibrium pressure | 40 | 15 | 6 | 6 |
| Monomer addition time under reduced pressure (hours) | 0 | 13 | 9 | 27 |
| Monomer added under reduced pressure (lbs.) | 0 | 46 | 71 | 101 |
| Total percent conversion of monomer to polymer | 80.7 | 93.5 | 97.3 | |
| Polymer viscosity as 2% solution in o-dichlorobenzene at 120° C | 2.43 | 2.58 | 2.15 | 2.03 |
| Polymer void volume (percent) | 46.9 | 34.4 | 25.5 | 37.6 |

The above data illustrate that the utilization of the present process wherein vinyl chloride monomer is continuously added to polymer seed particles under a pressure less than the equilibrium pressure of the polymerization reaction while such polymerization reaction is maintained at a constant temperature, significantly reduces the porosity of the resulting polymer particles.

It is to be understood that this invention contemplates the preparation of any vinyl chloride polymer in aqueous suspension as described herein, whereon such polymer contains at least about 80 weight percent of vinyl chloride in the polymer molecule.

What is claimed is:

1. A bath process for preparing vinyl chloride homopolymer of reduced porosity in aqueous suspension of pre-formed monomer droplets in the presence of a monomer-soluble polymerization catalyst and a suspension agent while maintaining an essentially constant reaction temperature comprising: (1) continuing the polymerization reaction until a decrease of from 6 to 15 p.s.i. from the liquid-vapor equilibrium pressure of said reaction occurs, then (2) maintaining the reduced pressure by the incorporation of additional monomer and polymerizing of the same in contact with the previously formed polymer until a polymer product of lower porosity is obtained.

2. The process of claim 1 wherein said vinyl chloride polymer is polyvinyl chloride.

3. The process of claim 2 wherein said oil-soluble polymerization catalyst is an organic peroxide.

4. The process of claim 3 wherein said organic peroxide is lauroyl peroxide.

5. The process of claim 4 wherein said reaction temperature is about 50° C.

No references cited.

JOSEPH L. SCHOFER, Primary Examiner

J. A. DONAHUE, JR., Assistant Examiner

U.S. Cl. X.R.

260—85.5 R, 95